United States Patent
Parsons et al.

(10) Patent No.: US 9,710,627 B2
(45) Date of Patent: Jul. 18, 2017

(54) COMPUTER IMPLEMENTED SECURITY METHOD AND SYSTEM

(71) Applicant: BeCrypt Limited, London (GB)

(72) Inventors: Bernard Parsons, London (GB); Nigel Lee, London (GB); Ben Sidle, London (GB)

(73) Assignee: BeCrypt Limited, London (GB)

( * ) Notice: Subject to any disclaimer, the term of this patent is extended or adjusted under 35 U.S.C. 154(b) by 0 days.

(21) Appl. No.: 13/902,432

(22) Filed: May 24, 2013

(65) Prior Publication Data

US 2013/0318597 A1 Nov. 28, 2013

(30) Foreign Application Priority Data

May 25, 2012 (GB) .................................. 1209241.7

(51) Int. Cl.
*G06F 21/31* (2013.01)
*G06F 21/36* (2013.01)

(52) U.S. Cl.
CPC .............. *G06F 21/31* (2013.01); *G06F 21/36* (2013.01)

(58) Field of Classification Search
CPC .......... G06F 21/31; G06F 21/36; G06F 3/041; H04L 9/32; H04L 9/3226; H04L 2209/805
USPC ............................................. 713/168; 726/19
See application file for complete search history.

(56) References Cited

U.S. PATENT DOCUMENTS

| 8,756,672 | B1 * | 6/2014 | Allen et al. ........................ 726/7 |
| 2004/0111646 | A1 | 6/2004 | Little | |
| 2008/0016369 | A1 * | 1/2008 | Kirovski et al. ............... 713/184 |
| 2010/0180336 | A1 * | 7/2010 | Jones et al. ...................... 726/19 |
| 2011/0307952 | A1 | 12/2011 | Xie | |
| 2012/0159613 | A1 * | 6/2012 | Griffin et al. .................... 726/19 |
| 2012/0252410 | A1 * | 10/2012 | Williams ................ G06F 21/36 455/411 |
| 2013/0229367 | A1 * | 9/2013 | Pinch ...................... G06F 21/36 345/173 |
| 2013/0234971 | A1 * | 9/2013 | Li ................................. 345/173 |

FOREIGN PATENT DOCUMENTS

| DE | 10 2009 052 174 B3 | 10/2010 |
| EP | 1 868 125 A1 | 12/2007 |
| WO | WO 2009/022242 A1 | 2/2009 |
| WO | WO 2012/055348 A1 | 5/2012 |

OTHER PUBLICATIONS

Hoanca, B., & Mock, K. J.; Screen oriented technique for reducing the incidence of shoulder surfing; Jun. 2005; In Security and Management (pp. 334-340).*

Menezes, A. et. al. "Handbook of Applied Cryptography." Chapter 10: Identification and Entity Authenication, p. 385-424. 1997.

* cited by examiner

*Primary Examiner* — Harunur Rashid
(74) *Attorney, Agent, or Firm* — Leason Ellis LLP

(57) ABSTRACT

A computer implemented security system (10) and method are disclosed. A user interface (20) is displayed on a display device (30), the user interface including a positioning guide (100) and a marker. User inputs are received on a password comprising a plurality of symbols and a location for each symbol in the user interface (20) relative to said positioning guide (100). Authentication is performed in dependence on the received user inputs and on the marker, the marker being selected from a plurality of markers, each marker designating a different condition to be met by the received user inputs to be successfully authenticated.

14 Claims, 4 Drawing Sheets

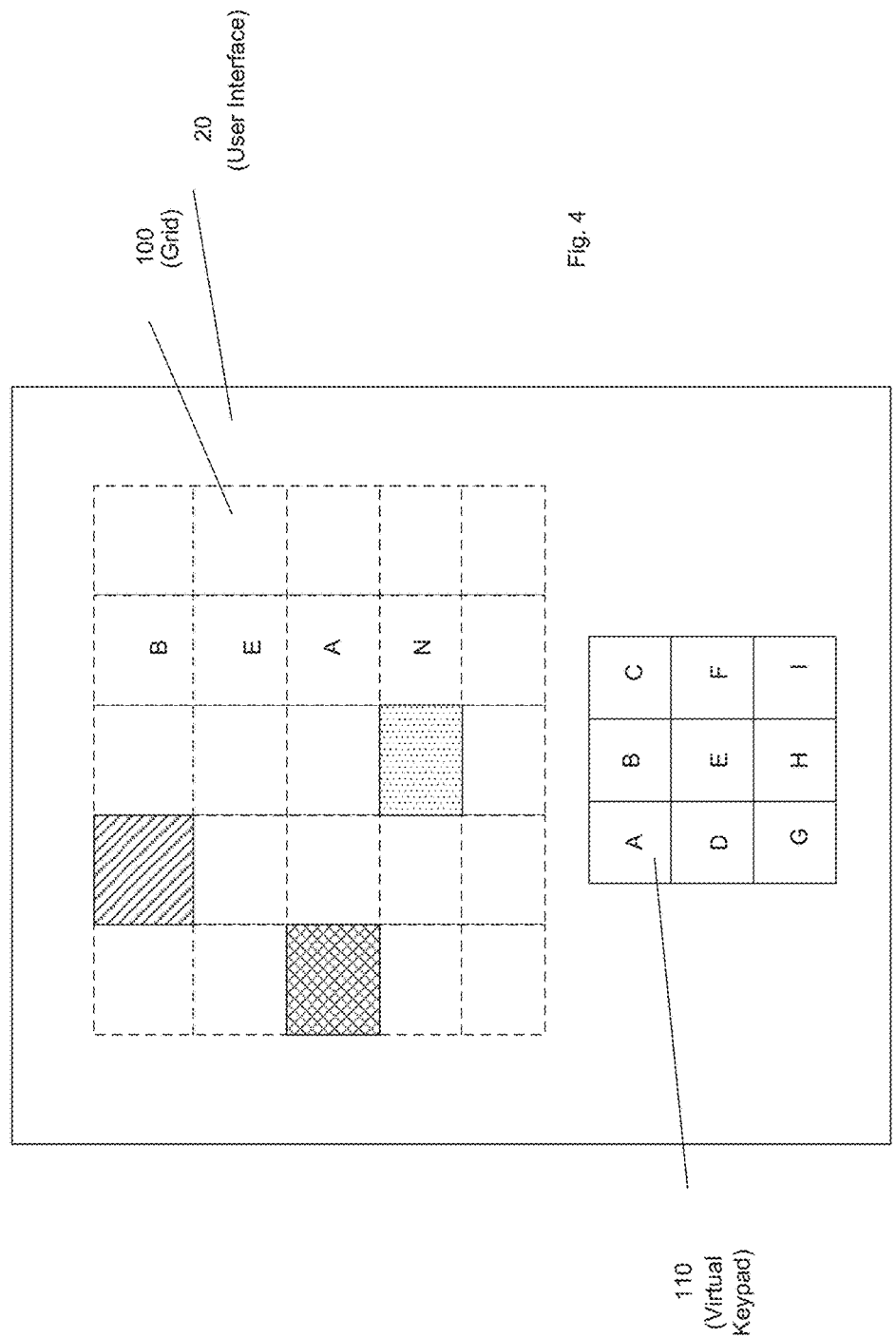

COMPUTER IMPLEMENTED SECURITY METHOD AND SYSTEM

FIELD OF THE INVENTION

The present invention relates to a computer implemented Security System and method that is particularly applicable to touch based systems such as mobile telephones and tablet devices.

BACKGROUND TO THE INVENTION

It is common for computer systems to include an authentication interface such as a log-on or lock screen that must be successfully passed in order to access some or all functions of the computer system.

This is particularly the case with mobile devices such as smartphones and tablet devices that can be easily lost or stolen and hold valuable data such as emails, address books (and in the case of current smartphones far, far more). It is also important to have a lock or log-on interface for publicly accessible systems such as cashpoints.

One exploit known to be used in lock or log-on screen base security systems is known as "shoulder surfing". Someone standing behind a user looks over their shoulder and observes the password sequence entered into the keyboard/keypad. In the case of smartphones, bankcards and the like, the device is then pickpocketed or otherwise stolen and can then be used in combination with the captured password.

Passwords usually consist of a sequence of alphanumeric characters, and protect a system by restricting access unless a user enters the correct characters in the correct order. Stronger passwords tend to be those that least resemble known words or derivatives of known words (such as random or pseudo-random passwords), as these can be guessed, or automatically generated by a dictionary attack. Another factor determining strength is referred to as the password space, which is a measure of the total number of combinations of the characters an attacker would be required to try. Password space is a function of password length, and the number of allowable characters (upper case, lower case, numerics . . . ).

Generally, the longer the password, the less likely it can be guessed or hacked by brute force computational techniques. However, the longer the password, the more likely a user will have to write it down, be unhappy about using the system or look at ways of circumventing it.

Password systems typically work by computing a password hash from a password, using a standard cryptographic function such as a 256 bit standard hashing algorithm (SHA 256).

The input to the password hash is typically an hexadecimal value (ASCII value) that acts as a code for the selected character. Once the codes are hashed, the resultant hash value can be used to protect a system, by for example forming part of an encryption key.

Good password systems ensure that hashes cannot be generated too rapidly, in order maximise the amount of time an automated password attack will on average require.

The alpha-numeric nature of passwords stems from the availability of input devices. As will be appreciated, almost all computing devices have keyboards of some description. Therefore, password systems exploit this common feature and expect passwords to be selected that can be entered by the keyboard.

Touchscreen based interfaces are the now standard in most smartphones and tablet devices. They are also attractive for other publicly accessible systems in place of keyboard or keypad based user interfaces. Touchscreen interfaces are flexible as different interfaces can be displayed by the touchscreen display as needed, can be made more weather resistant than a keyboard or keypad and as they have no moving parts do not suffer from mechanical wear and tear that can be a problem in a heavily used system.

However, touchscreen based interfaces present different challenges to keyboards or keypads, particularly from a security perspective.

With regard to password protection systems, regular password schemes can be enforced as touchscreen devices can emulate physical keyboards by displaying a virtual keyboard on screen. Non-character based password systems have been considered for touchscreen devices. For example, the Google Android® smartphone operating system allows a user to set a password based on a pattern that the user must draw on the device's touch screen in order to unlock the device.

One particular issue with either type of password system is that touch screens is that their semi-reflective nature is very effective in highlighting the oils and other dirt left by the touch of a user. This means that frequently used keys or key patterns are highlighted.

This can mean that user inputs such as keys or patterns selected leave behind an on-screen highlight from oils or marks from the user's fingers. While some users clean away grease marks and the like from their devices, others do not. Furthermore, in the case of devices that include screen protectors, repeated entry of a pattern or key sequence can result in permanent marking of the screen protector, whether they are cleaned or not. As a result, repeated entry of a password or drawing of a password pattern on the touch screen over time builds up marks. These marks can be used by a thief to guess the password/pattern and thereby significantly reduce the security provided by a password or password pattern.

SUMMARY OF THE INVENTION

According to an aspect of the present invention, there is provided a computer implemented security method for authentication of a password comprising:
  encoding, in a data repository, data on a password to be authenticated;
  executing, by a processor, a security module including:
  executing, by the processor, computer program code to display a user interface on a display device, the user interface including a positioning guide and a marker;
  executing, by the processor, computer program code to receive user inputs on:
    a password comprising a plurality of symbols; and,
    a location for each symbol in the user interface relative to said positioning guide; and
  executing, by the processor, computer program code to authenticate the user in dependence on the received user inputs and on the marker, wherein the marker is selected from a plurality of markers, each marker designating a different condition to be met by the received user inputs to successfully authenticate the user.

The positioning guide may include a grid defining a plurality of candidate positions, each candidate position comprising a possible location for a symbol of the password.

The positioning grid may include one or more invalid locations, the method comprising executing, by the processor, computer program code to reject authentication upon placement of a symbol in one of said invalid locations.

The symbols may be selected from a set including alphanumeric symbols, other characters, geometric symbols, graphical images, photographic images and user-drawn images.

Authentication may be for access to a computer system that includes a touch screen system, the step of executing, by the processor, computer program code to display the user interface further comprising executing, by the processor, computer program code to display a plurality of candidate symbols, wherein the step of executing, by the processor, computer program code to receive user inputs includes executing, by the processor, computer program code to receive user inputs via the touch screen to position each symbol of the password selected from the plurality of candidate symbols at a location on the user interface.

The method may further comprise executing, by the processor, computer program code to receive the password to be authenticated and executing, by the processor, computer program code to store a hash of the authentication password in the data repository, wherein the step of executing, by the processor, computer program code to authenticate includes executing, by the processor, computer program code to apply a hashing function to the user inputted password and comparing the results of the hashing function to the stored hash.

The method may further comprise executing, by the processor, computer program code to determine the hashing function in dependence on selected ones of the user inputs and the marker.

The conditions designated by markers may include one or more selected from a set including:
location for entry of first symbol of the password, orientation in which to enter the password, an offset from which the first symbol of the password is to be entered, a character of the password to be omitted and use of an alternate password associated with the marker.

According to another aspect of the present invention, there is provided a security system for password authentication comprising:
a display, a user input device, a processor and a memory encoding data on a password to be authenticated, the processor being configured to execute computer program code to displaying a user interface on the display, the user interface including a positioning guide and a marker;
the user input device being configured to receive user inputs on:
  a password comprising a plurality of symbols; and
  a location for each symbol in the user interface relative to said positioning guide;
the processor being configured to receive data on the user inputs and execute computer program code to authenticate the received user inputs in dependence on the data on the password to be authenticated and on the marker, wherein the marker is selected from a plurality of markers, each marker designating a different condition to be met by the received user inputs to successfully authenticate the user.

The display and user input device may comprise a touch screen system, the touch screen system being configured to display the positioning guide and receive user inputs via the touch screen to position each symbol of the password with at positions determined respect to the positioning guide.

The memory may encode a hash of the password, the processor being configured to execute a hashing function on the user inputted password and compare the results of the hashing function to the stored hash to determine authentication.

The display, user input device, processor and memory may be components of device selected from a smartphone or a tablet computing device, the security system operating a lock screen user interface for authenticating access to the device.

According to another aspect of the present invention, there is provided a computer implemented security system comprising:
a processor configured to execute computer program code for executing a security system, including:
  computer program code configured to user interface on a display device, the user interface including a positioning guide and a marker;
  computer program code configured to receive user inputs on:
  a password comprising a plurality of symbols;
  a location for each symbol in the user interface relative to said positioning guide; and
  computer program code configured to authenticate the user in dependence on the received user inputs and on the marker, wherein the marker is selected from a plurality of markers, each marker designating a different condition to be met by the received user inputs to successfully authenticate the user.

The positioning guide may include a grid defining a plurality of candidate positions, each candidate position comprising a possible location for a symbol of the password.

The positioning grid may include one or more invalid locations, the security system further comprising computer program code configured to reject authentication upon placement of a symbol in one of said invalid locations.

The system may further comprise a touch screen system, the security system further comprising computer program code configured to display a plurality of candidate symbols, and computer program code to receive user inputs via the touch screen to position each symbol of the password selected from the plurality of candidate symbols at a location on the user interface.

The system may further comprise computer program code configured to receive the password to be authenticated and computer program code configured to store a hash of the authentication password in a data repository, the security system further comprising computer program code configured to apply a hashing function to the user inputted password and comparing the results of the hashing function to the stored hash.

The system may further comprise computer program code configured to determine the hashing function in dependence on selected ones of the user inputs and the marker.

The conditions designated by markers may include one or more selected from a set including:
location for entry of first symbol of the password, orientation in which to enter the password, an offset from which the first symbol of the password is to be entered, a character of the password to be omitted and use of an alternate password associated with the marker.

In one embodiment, a computer implemented security system comprises:
a processor and a memory, the memory encoding instructions executable by the processor and operable to:
  cause a user interface to be displayed on a display device;
  receive user inputs on a password comprising a plurality of symbols and on a location for each symbol on the user interface; and
  authenticate the user in dependence on the received user inputs.

Preferably, the user interface includes a grid defining a plurality of candidate positions, each candidate position comprising a possible location for a symbol of the password.

Symbols may be alphanumeric symbols, other characters, geometric symbols or the like. Symbols may be designated on an associated keyboard (virtual or physical) or they could be drawn on screen if the user interface has such a capability. In a preferred embodiment, the system is implemented in a touch screen system and symbols are dragged or otherwise selected from a virtual keyboard and placed at appropriate positions in the grid.

The grid may be a geometric shape or some other shape. For example it may be a wireframe image of a character. A location may be an intersection of vertices of the grid or it may be particular shapes defined by the vertices of the grid. The grid may define valid and invalid locations, placement of a symbol in an invalid location may cause immediate rejection of authentication or may be a trigger for some other action such as locking of the user account, communication of an alert etc.

The password may be positioned in a particular shape or orientation in the grid. The grid may include an identifier such as a marker or other means of advising the user where to start the password and/or which orientation to use. Such an identifier may be randomly moved about the screen for each new authentication attempt. It may be that the password is started at a position offset from the identifier (for example, three squares left of the start symbol).

BRIEF DESCRIPTION OF THE DRAWING FIGURES

FIG. 4 illustrates the user interface of FIG. 2 now with variable entry point markers in the interface.

DETAILED DESCRIPTION OF CERTAIN EMBODIMENTS OF THE INVENTION

Figure 1:
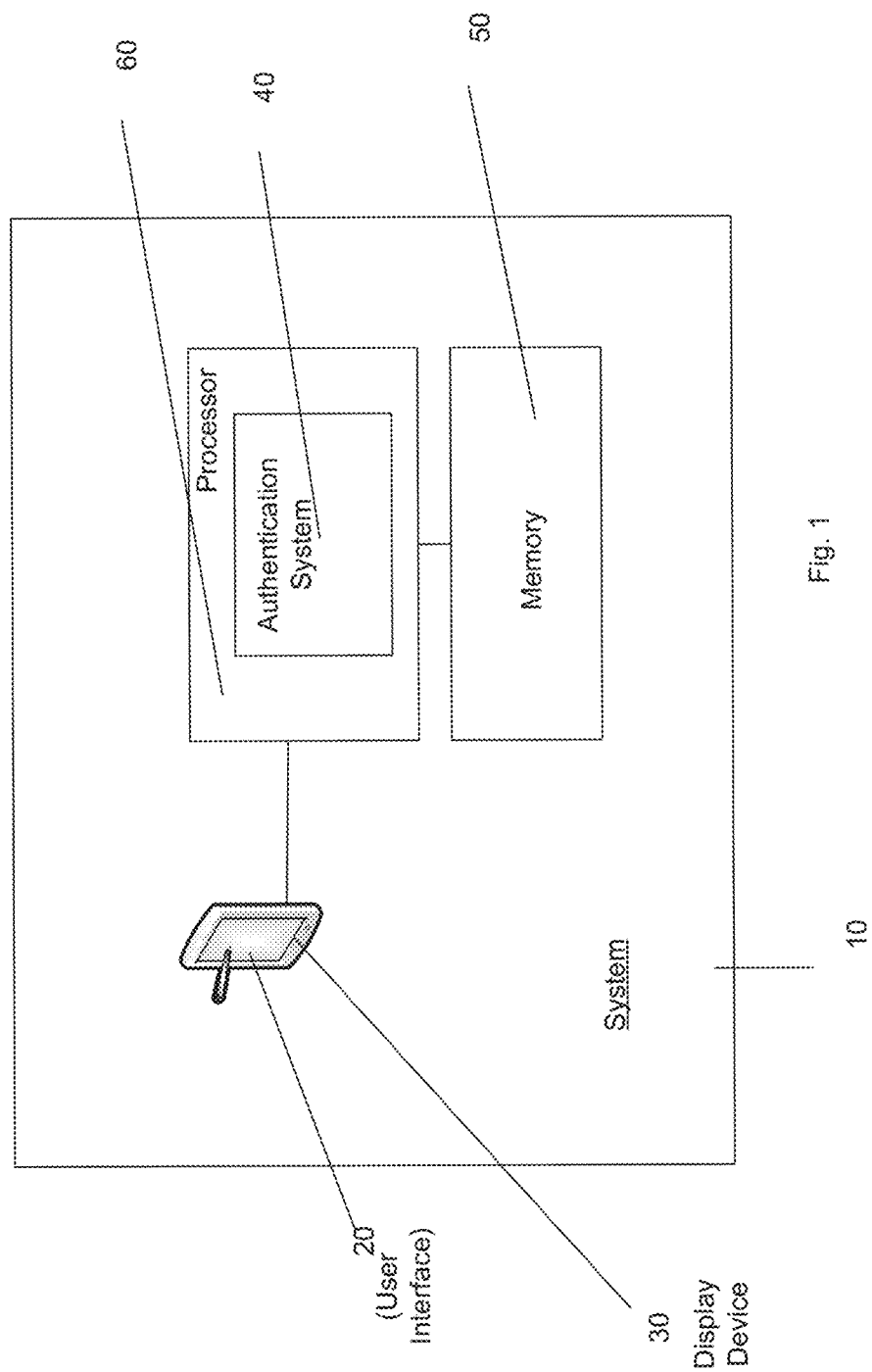
FIG. 1 is a schematic diagram of a computer implemented lock interface system according to an embodiment of the present invention.

FIG. 1 is a schematic diagram of a computer implemented lock interface system according to an embodiment of the present invention.

The system 10 includes a user interface 20 to be displayed on a display device 30. The user interface is arranged to communicate with an authentication system 40 that is encoded in a memory 50 and executed by a processor 60 of the system 10.

The user enters a password via the user interface 20 which is communicated to the authentication system and a hash corresponding to the password is computed by the processor 60. The hash is then compared with a pre-computed hash provided by the user (or provided to the user by, for example, a system administrator or as a default password) and if the comparison is successful then the user is deemed to have provided a correct password and authenticated.

It will be appreciated that the hash comparison may be performed locally to the system 10 or in conjunction with some remote authentication system such as a network server or other authentication system.

Action by the processor 60 upon authentication will be dependent on the particular implementation but would typically involve the processor communicating with other components to unlock functionality and enable the user to perform otherwise prohibited acts. For example, the user interface 20 may be a lock type screen that cannot be passed without providing a correct password. Upon authenticating the password, the processor 60 causes the user interface 20 to be replaced with a different one from which the user can access predetermined functions of the associated device/system.

Figure 2:
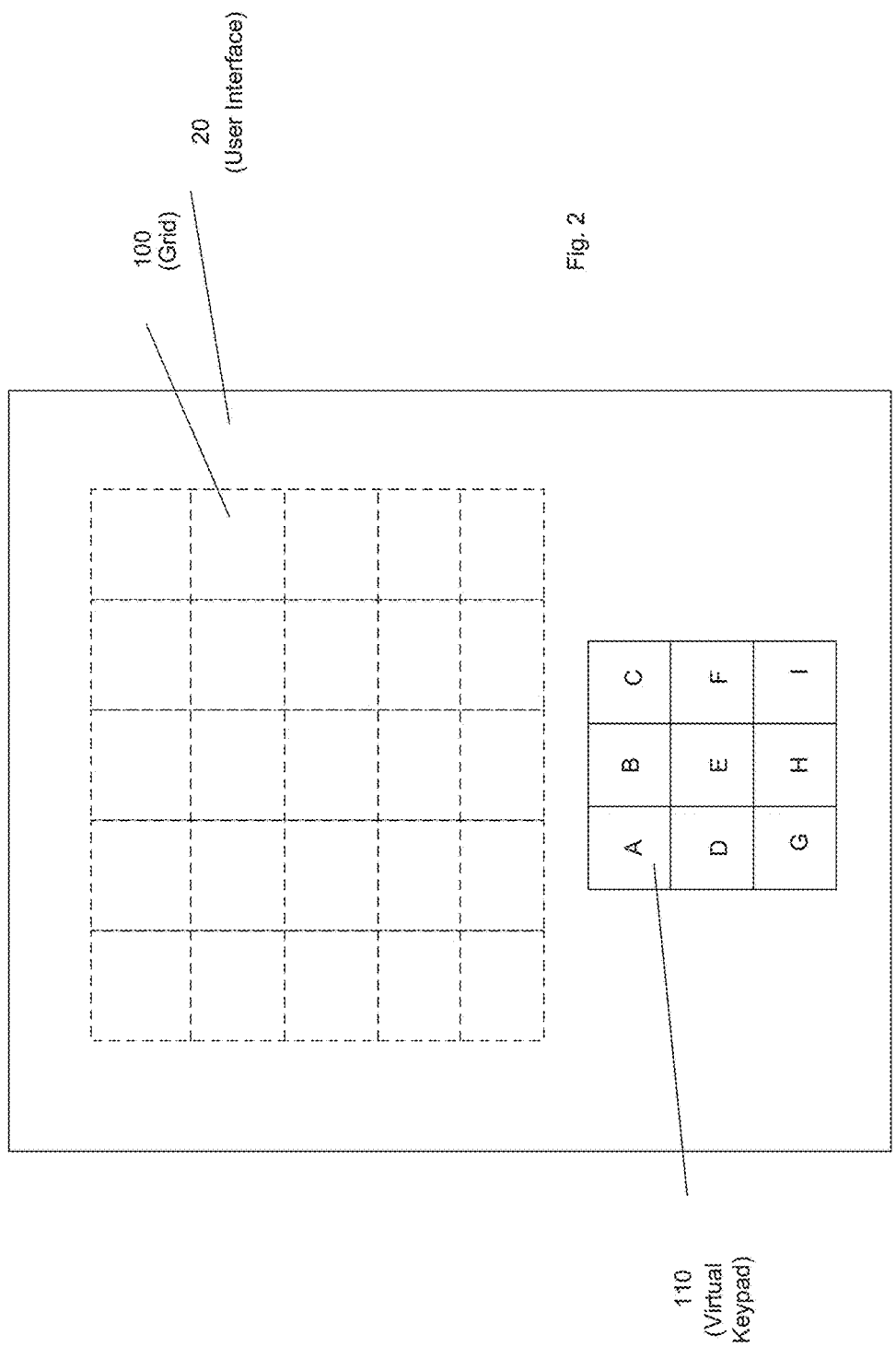
FIG. 2 illustrates a user interface presented by one embodiment of the present invention.

FIG. 2 illustrates a user interface 20 presented by one embodiment of the present invention.

In this embodiment, the user interface 20 includes a grid 100 and a virtual key pad 110 defining a number of virtual keys. Via an input device (preferably the display device is a touch screen display device but it will be appreciated that in alternate embodiments a mouse or other input device may be used to enable user inputs to be made and captured), the user selects entries from the virtual key pad and, for each selected entry, an associated location in the grid 100.

The user selects a combination of symbols (alphanumeric, icons, geometric symbols, images or whatever imagery is selected for the virtual keys) for a password. However, the symbol combination is only part of the password. The location of the respective symbols in the grid completes the password.

Figure 3:
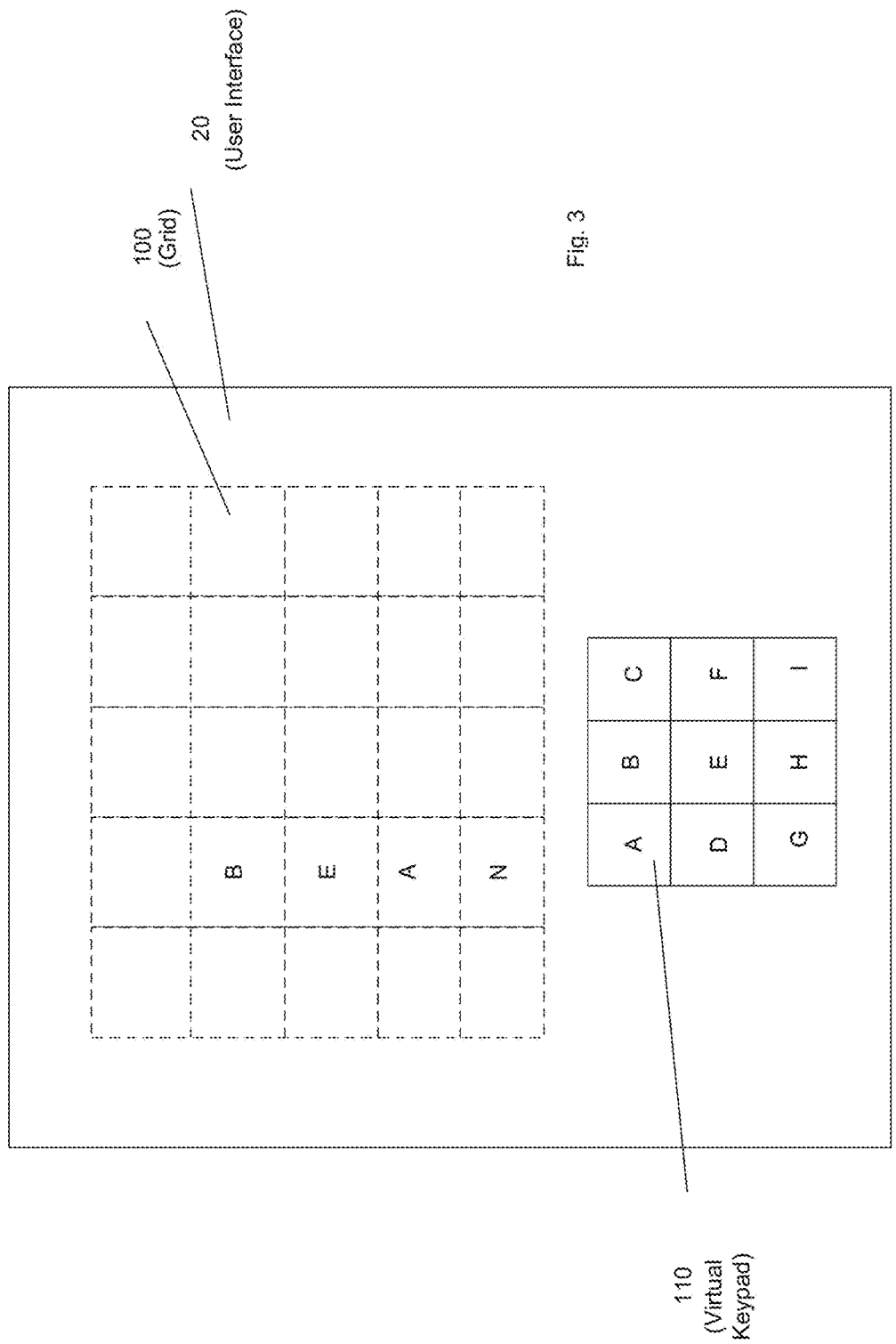
FIG. 3 illustrates the user interface of FIG. 2 showing symbols placed in a pattern.

Each symbol is placed in a sequence in the grid that together trace a simple pattern that the user has memorised as shown in FIG. 3 in which the password "BEAN" has been entered at the predetermined position. In this way, the password space is significantly increased for any given symbol set. The password space now becomes a function of password length, symbol set, position on grid and shape on grid.

Not only is the arrangement user friendly and inherently easier to remember than a complex password, in preferred embodiments it can also have the effect of complicating password attacks designed to compromise a system as the following example demonstrates.

Assuming a symbol set of just lower case letters is used; that passwords are entirely random and are 5 characters in length. The password space for a typical password scheme would be given as:

$$\text{Password Space} = 26^5 = 11.9 \text{ m or } 11.9 \times 10^6$$

Assuming that for a given system 100,000 password hashes can be generated and tested per second:

A brute force attack would on average take approximately 2 minutes.

Using the same 5 character password using a grid system the password space is approximated as follows:

Grid Password Space=Basic password space×number of possible grid start locations×number of possible password shapes.

In one example, within a 16×16 grid, password space calculations may assume the start position to be within a subset of the grid, with an area of size 10×10. For a 5 character password, each subsequent character can be placed in one of 8 locations that are adjacent or diagonal to the previous character. Possible password shapes may be computed as password length—1 to the power of 8.

So for the current example, password space $$= 11.9 \times 10^6 \times (10 \times 10) \times (5-1)^8$$

$$= 11.9 \times 10^6 \times 100 \times 65536$$

$$= 78 \times 10^{12}$$

Based on the same assumption above of 100,000 password hashes per second, a brute force attach would take on average approximately $7.8 \times 10^8$ s or 24 years.

Each element of the password space function (password, start location and shape) could be encoded separately for input to the hash function using a variety of schemes. The password characters may each be represented by a 2 byte value, typically an ASCII code.

Position could be represented as x and y coordinate using a single 8 bit (one byte) value, encoding one of 256 possible start locations. The first 4 bits may represent x and the second 4 bits y.

A further byte value would be sufficient for encoding one of each possible patterns, although additional bytes would be required if the password length were to exceed 5 characters. Patterns can be encoded using a numeric representation of each of the four possible directions pursued for each section of the pattern. One scheme would use different value 2 bit nibbles to encode each direction. For example, in binary, 00=up, 01=left, 10=down 11=right. Starting with a zeroed double byte value the four nibbles would be added at bit offsets of 0, 2, 4 and 6.

As well as being resistant to automated password attacks, computer systems have to be resistant to human-related vulnerabilities, an example being "shoulder surfing". The above grid system proposes a 2 dimensional interface for password entry that may be vulnerable to an adversary viewing a legitimate user entering their password.

Such a risk could be mitigated by introducing a variable element to the start point of the password entry. Instead of requiring the user to remember where a password pattern should start on a grid, the user is required to remember where the start point is relative to a marker as illustrated in FIG. 4. Possible markers include random shapes and colours that are auto-generated and appear in a different location each time the system is started.

As an example, assume a single red (dotted), green (hatched) and blue (checked) square are randomly positioned on the grid at system start. The user's password scheme requires that the password is entered at a point with a specific offset from the green square (two squares left in this example). If an adversary succeeds in overlooking the password entry, there is no way of determining, without the hidden knowledge of the user, from which square the offset was calculated.

The scheme could be further developed to increase the number of observations required to devise the user's knowledge by, for example, increasing the number of coloured shapes used, and forcing multiple offset relationships to persist over multiple password entry events instead of random positioning.

Additionally, greater randomness may be achieved by having password symbols entered using non-adjacent grid squares.

In one embodiment, a number of different markers may be designated or predetermined, each marker specifying a different condition such as offset, direction in which the password is entered, nth character to be omitted or even entry of a different password associated with the marker. In one embodiment, the number of markers are each visually different in appearance, colour, shape, size or other attribute. In another embodiment, markers may differ in position in the position guide (so a marker at position X1, Y1 being a different marker than one positioned at X5, Y2, for example). In one embodiment, multiple markers may be used in combination, one specifying offset, another orientation the password is entered, for example. Markers and their associated conditions may be pre-determined by the user at time of registration or may be set by the system and provided to the user to remember for example.

In one example, the markers and/or grid positions may in combination encode elements of a hashing function that is to be applied to the entered password, the resultant hash being compared against a pre-computed hash of the user's password to determine authentication. In such an arrangement, data on the condition to be applied to the password based on the markers need not necessarily be recorded/applied. At least aspects of the condition would be inherently associated with the elements of the hashing function selected by the user when placing a character in a respective position—only placing characters in the correct position would result in the hashing function being selected/compiled that would, when applied to the password, yield a hash that would match the original hashed password and result in authentication.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A computer implemented security method for authentication of a password comprising:
   encoding, in a data repository, data on a password to be authenticated including a hash of the password to be authenticated;
   executing, by a hardware processor, a security module including:
   executing, by the processor, computer program code to display a user interface on a display device, the user interface including a positioning guide displayed within the user interface and a marker;
   executing, by the processor, computer program code to receive user inputs on:
   a password comprising a plurality of symbols, and
   a location for each symbol in the user interface relative to said positioning guide;
   executing, by the processor, computer program code to determine a hashing function in dependence on selected ones of the user inputs and the marker; and executing, by the processor, computer program code to authenticate the user in dependence on the received user inputs and on the marker, wherein the step of executing, by the processor, computer program code to authenticate includes applying the hashing function to the user inputted password and comparing the results of the hashing function to the stored hash, wherein the marker is selected from a plurality of markers, each marker designating a different condition to be met by the received user inputs to successfully authenticate the user, and wherein the positioning guide includes a grid defining a plurality of candidate positions, each candidate position comprising a possible location for input of a symbol among the plurality of symbols of the password, the positioning guide being absent of symbols of the password prior to receiving the user inputs on the password, the marker being positioned at one of any candidate positions within the grid and the condition being an offset number of positions from the position of the marker at which the password is to be entered.

2. The computer implemented security method of claim 1, wherein the positioning grid includes one or more invalid locations, the method comprising executing, by the processor, computer program code to reject authentication upon placement of a symbol in one of said invalid locations.

3. The computer implemented security method of claim 1, wherein the symbols are selected from a set including alphanumeric symbols, other characters, geometric symbols, graphical images, photographic images and user-drawn images.

4. The computer implemented security method of claim 1, wherein authentication is for access to a computer system that includes a touch screen system, the step of executing, by the processor, computer program code to display the user interface further comprising executing, by the processor, computer program code to display a plurality of candidate symbols, wherein the step of executing, by the processor, computer program code to receive user inputs includes executing, by the processor, computer program code to receive user inputs via the touch screen to position each symbol of the password selected from the plurality of candidate symbols at a location on the user interface.

5. The computer implemented security method of claim 1, further comprising executing, by the processor, computer program code to receive the password to be authenticated.

6. The computer implemented security method of claim 1, wherein the conditions designated by markers include one or more selected from a set including:
location for entry of a first symbol of the password, orientation in which to enter the password, an offset from which the first symbol of the password is to be entered, a character of the password to be omitted and use of an alternate password associated with the marker.

7. The computer implemented security method of claim 1, further comprising displaying a further marker selected from the plurality of markers at a candidate position in the grid, the further marker designating a further condition to be met by the received user inputs to successfully authenticate the user.

8. The computer implemented security method of claim 7, wherein the further marker designates a further condition selected from a set including: a further offset; direction in which the password is to be entered, nth character to be omitted and entry of a different password associated with the marker.

9. A security system for password authentication comprising:
a display, a user input device, a processor and a memory encoding data on a password to be authenticated including a stored hash of the password to be authenticated, the processor being configured to execute computer program code to display a user interface on the display, the user interface including a positioning guide identifying candidate positions for symbols of the password and a marker;
wherein the user input device is configured to receive user inputs on:
a password comprising a plurality of symbols, and
a location for each symbol in the user interface, each location being a different candidate position identified by said positioning guide;
wherein the processor is configured to determine a hashing function in dependence on selected ones of the user inputs and the marker; and
wherein the processor is configured to receive data on the user inputs and execute computer program code to authenticate the received user inputs in dependence on the data on the password to be authenticated and on the marker, and wherein the processor is configured to authenticate by executing a hashing function on the user inputted password and comparing the results of the hashing function to the stored hash to determine authentication,
wherein the marker is selected from a plurality of markers, each marker designating a different condition to be met by the received user inputs to successfully authenticate the user,
wherein each candidate position identified by the positioning guide is unoccupied by symbols of the password prior to the processor receiving the data on the user inputs on the password, and
wherein the display and user input device comprise a touch screen system, the touch screen system being configured to display the positioning guide within the touch screen system and receive user inputs via the touch screen to position each symbol of the password at positions determined with respect to the positioning guide, the marker being positioned at one of any candidate positions within the positioning guide and the condition being an offset number of positions from the position of the marker at which the password is to be entered.

10. The security system of claim 9, wherein the display, user input device, processor and memory are components of a device selected from a smartphone or a tablet computing device, the security system operating a lock screen user interface for authenticating access to the device.

11. A computer implemented security system comprising:
a hardware processor configured to execute computer program code for executing a security system, including:
computer program code configured to receive a password to be authenticated and store a hash of the password to be authenticated in a data repository;
computer program code configured to user interface on a display device, the user interface including a positioning guide and a marker;
computer program code configured to receive user inputs on:
a password comprising a plurality of symbols;
a location for each symbol in the user interface relative to said positioning guide;

computer program code configured to determine a hashing function in dependence on selected ones of the user inputs and the marker; and computer program code configured to authenticate the user in dependence on the received user inputs and on the marker and by applying the hashing function to the user inputted password and comparing the results of the hashing function to the stored hash, wherein the positioning guide includes a grid defining a plurality of candidate positions, each candidate position comprising a possible location for a symbol of the password, the grid being absent of password symbols prior to the computer program code receiving said user inputs, the marker being positioned at one of any candidate positions within the grid and the condition being an offset number of positions from the position of the marker at which the password is to be entered, and wherein the marker is selected from a plurality of markers, each marker designating a different condition to be met by the received user inputs to successfully authenticate the user.

12. The computer implemented security system of claim 11, wherein the positioning grid includes one or more invalid locations, the security system further comprising computer program code configured to reject authentication upon placement of a symbol in one of said invalid locations.

13. The computer implemented security system of claim 11, further comprising a touch screen system, the security system further comprising computer program code configured to display a plurality of candidate symbols, and computer program code to receive user inputs via the touch screen to position each symbol of the password selected from the plurality of candidate symbols at a location on the user interface.

14. The computer implemented security system of claim 11, wherein the conditions designated by markers include one or more selected from a set including:

location for entry of a first symbol of the password, orientation in which to enter the password, an offset from which the first symbol of the password is to be entered, a character of the password to be omitted and use of an alternate password associated with the marker.

* * * * *